United States Patent Office 3,067,841
Patented Dec. 11, 1962

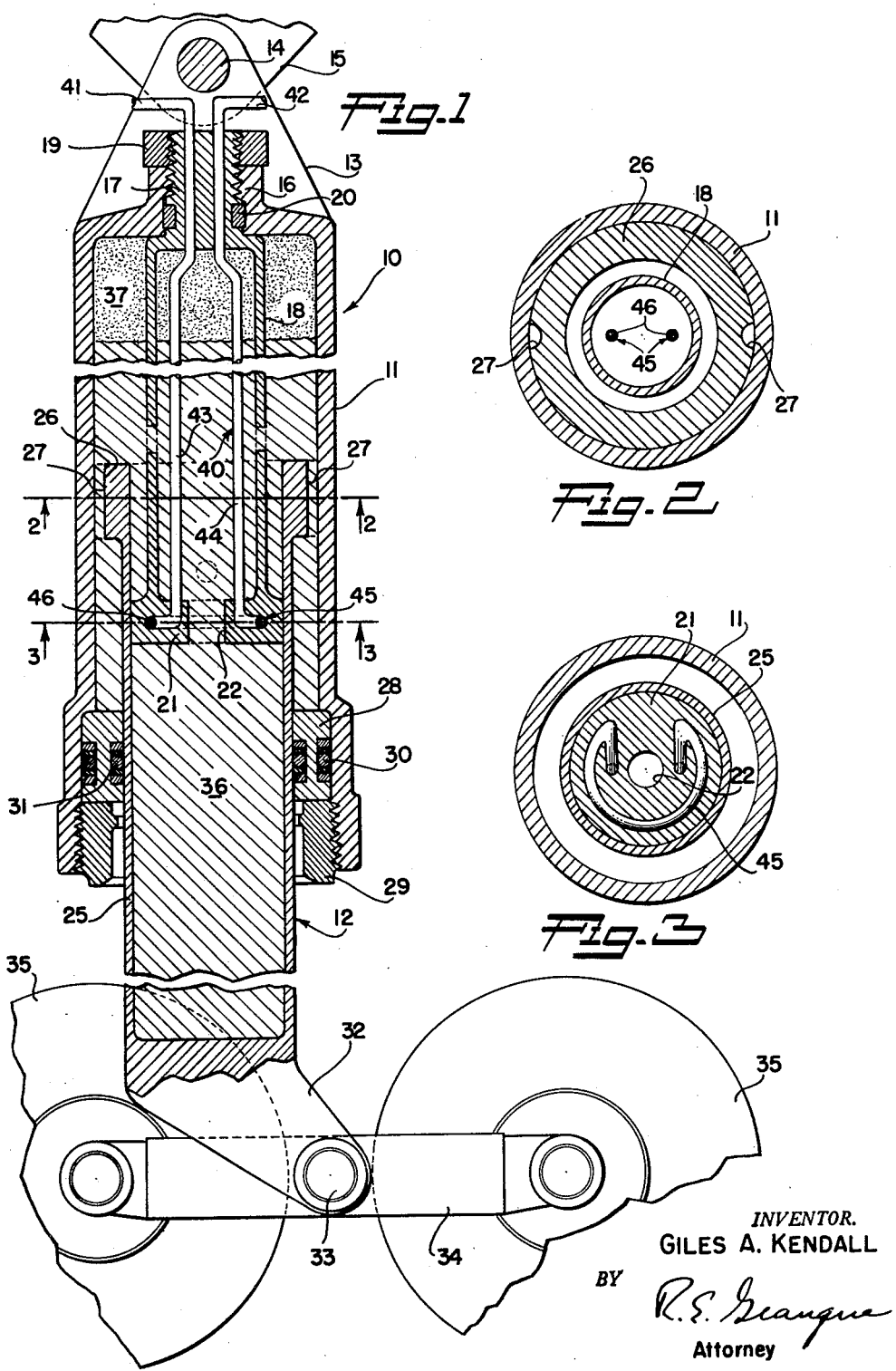

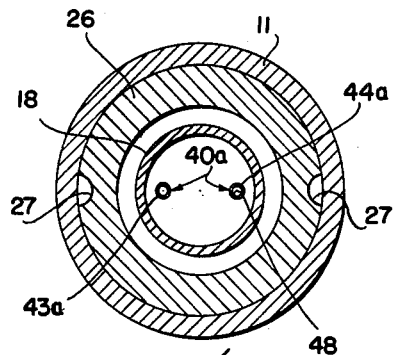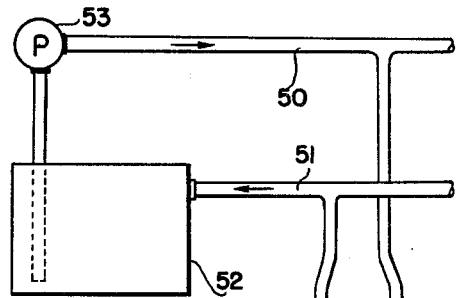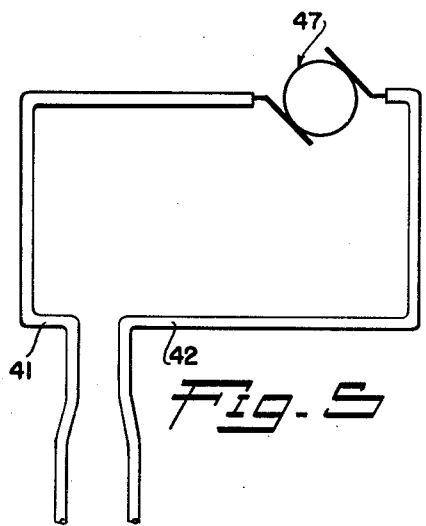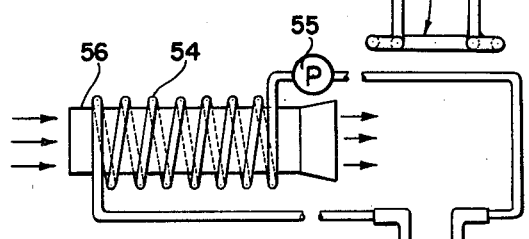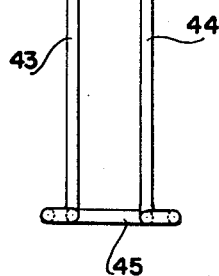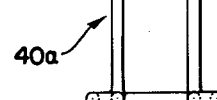

3,067,841
APPARATUS UTILIZING LIQUID SUBSTANCES
OVER LARGE TEMPERATURE RANGE
Giles A. Kendall, Van Nuys, Calif., assignor to Menasco
Manufacturing Company, Burbank, Calif., a corporation of California
Filed Dec. 14, 1959, Ser. No. 859,278
2 Claims. (Cl. 188—100)

This invention relates to apparatus, such as liquid springs, liquid dampers, and the like which utilize a substance in liquid state over a large temperature range and more particularly, relates to heating means for maintaining the liquid state of the substance at low temperatures where the substance might otherwise become solid and prevent utilization of the apparatus.

Substances, such as sodium-potassium eutectic (NaK 77) which is a mechanical mixture of 33% sodium and 77% potassium, has been utilized as a liquid in devices which have been subjected to high temperatures during operation. This substance has a melting point in the vicinity of 10° F. and a boiling point in the vicinity of 1443° F. so that it is apparent that it will remain a liquid over a wide temperature range. Other substances such as a lead-bismuth eutectic or a salt could also be utilized in the same manner over a temperature range between the melting point and the boiling point of these substances. However, it has not been possible to use these liquids in aircraft components, such as shock absorbers, since such a device must remain operative down to temperature of —65° F.

The present invention provides heating means which permits the use of metals, such as NaK77, in liquid springs, dampers and shock absorbers over a temperature range extending to a temperature substantially below the melting point of the substance. More particularly, it is proposed to insert heating means, utilizing either electrical energy or heated fluid, into the substance used as a liquid in the device in order to maintain a temperature above the melting point within the device even though the surrounding ambient temperature is substantially below the melting point of the substance. In the form of the invention chosen for illustration, the heating means can extend through one end of a shock absorber and through a fixed damping head located centrally in the substance within the shock absorber. By locating heating coils in this manner, the coils can contain either electrical heating elements or can receive a heated fluid, whose temperature is raised by heat exchange with an engine or other high temperature components in the vicinity of the shock absorber.

It is therefore an object of the present invention to provide apparatus, such as dampers, liquid springs or shock absorbers, which utilize a substance in liquid form over an extreme ambient temperature range, said liquid being held above the melting point of the substance by heating means located within the apparatus when low ambient temperature conditions exist which would normally cause the substance to freeze into a solid.

Another object of the present invention is to provide a high temperature shock absorber which is suitable for use on aircraft and which encounters a temperature range requiring the use of a substance which must be heated at the low temperatures of the range in order to maintain the substance in the liquid state.

A further object of the invention is to provide heating means for apparatus which supplies internal heat energy to prevent the operating liquid within the apparatus from becoming a solid at the lowest temperatures in the operating temperature range.

These and other objects of the invention not specifically set forth above will become readily apparent from the accompanying description and drawings in which:

FIGURE 1 is a sectional view of an aircraft shock absorber showing one end of the shock absorber attached to a component of the air frame and the other end secured to the landing wheels.

FIGURE 2 is a transverse horizontal section along line 2—2 of FIGURE 1 showing one pair of damping orifices and the electrical heating element.

FIGURE 3 is a horizontal transverse section along line 3—3 of FIGURE 1 showing the heating element embedded in a fixed head section for the other orifice.

FIGURE 4 is a sectional view similar to FIGURE 2 of a modification utilizing a heating fluid.

FIGURE 5 is a diagrammatic illustration of the electrical energy supply for the heating element of FIGURE 2.

FIGURE 6 is a diagrammatic illustration of the heated hydraulic fluid supply to the heating coils of FIGURE 4, and FIGURE 7 is a diagrammatic illustration of a heat exchanger for providing the heating fluid for the coils of FIGURE 4.

Referring to FIGURE 1, the embodiment of the invention chosen for illustration comprises a high temperature shock absorber 10 having a casing 11 which receives a piston 12. The casing 11 has a pair of extensions 13 (only one of which is shown) containing openings for a pin 14 which also extends through brackets 15 attached directly to an air frame or other support structure. A central end projection 16 on casing 11 is threaded to receive the end 17 of a perforated tubular member 18 which extends into the casing 11. A lock nut 19 secures the end 17 and the threaded connection is sealed by annular sealing member 20. A head 21 is supported by tubular member 18 and contains an orifice 22 for the passage of liquid from one side to the other of the head.

The piston 12 comprises a hollow, cylindrical shell portion 25 which passes snugly around the orifice head 21 and terminates in a piston head 26 which fits snugly within casing 11. The circumference of the piston head 26 contains a pair of orifices 27 which permit liquid to flow from one side to the other of the piston head. The cylindrical shell portion 25 passes snugly through a retainer ring 28 which is secured in the open end of casing 11 by means of a circular nut 29 threaded into the end of the casing. The opposite sides of the ring 28 contain seals 30 and 31 to prevent leakage of liquid from the casing 11. The end of the shell portion 25 supports an extension 32 connected by a pin 33 to a bar structure 34 which supports wheels 35 at its opposite ends.

Since the orifices 22 and 27 in the shock absorber depends upon the movement of liquid therethrough to provide a damping and shock absorbing action, a major portion of the shock absorber 10 is filled with a liquid 36. Since the structural temperature of high speed aircraft is raised substantially upon re-entry into the atmosphere at high speeds, it is necessary that the liquid 36 be capable of remaining a liquid at these high temperatures since the device may be called upon to function at these temperatures. Also, while the aircraft is on the ground, the ambient temperature may be substantially below zero and it is important that the substance 36 remain in liquid state so that damping and shock absorbing action through the orifices can be obtained at these low temperatures. In addition to the substance 36, the device 10 contains an inert gas in space 37 which will not react chemically with the particular substance 36 being utilized. As previously stated, the substance 36 can be any suitable substance such as NaK 77, a eutectic alloy, which is a liquid over an extended temperature range but requires heating at low temperatures to remain a liquid. Because of the fact that the device 10 will encounter high temperature environments, the seals 20, 30 and 31 are preferably made of asbestos, ceramic or metal, and the other parts of the device 10 can be fabricated of high temperature alloy steels which maintain their strength at elevated temperatures.

A heating coil 40 has an inlet end 41 and an outlet end 42 which connect with two substantially parallel sections 43 and 44, respectively, which extend through the threaded end 17 and connect with a loop section 45 in the head 21 surrounding the orifice 22. The heating coil 40 contains electrical resistance wire 46 for developing heat within the substance 36 when the wire is connected to an external electric generator 47 (see FIGURE 5). Instead of electrical heating, the heating coil 40a can contain a liquid or gaseous heating medium in space 48 within the coil (see FIGURE 4). The sections 43a and 44a of coil 40a can be connected across the high pressure line 50 and the low pressure return line 51 of a hydraulic supply system, which also comprises a sump 52 and a pump 53 (see FIGURE 6). Since the hydraulic fluid in the system can quickly reach a temperature of several hundred degrees, the fluid can conveniently be used as the heating medium. Also, the sections 43a and 44a can be connected to the inlet and outlet of a heat exchanger coil 54 and any suitable fluid can be circulated through coil 40a by pump 55. The coil 54 can receive heat from any suitable external high temperature source, such as the section 56 of an aircraft engine (see FIGURE 7). Since the engine develops heat while on the ground, the substance 36 could be liquified prior to take off. When a sodium potassium mixture is utilized, the substance 36 would solidify at about 10° F. and it is only necessary for the heating tube 40 to develop enough heat to continually maintain the liquid state.

In operation, the engagement of wheels 35 with the ground causes the piston 12 to move into the casing 11.

This movement is damped since liquid must flow through the orifice 22 which is fixed with respect to the casing 11. Because of the reduction in volume, the inert gas in space 57 is increased in pressure. After the initial landing load has been absorbed, the high pressure gas will act to force piston 12 out of casing 11 and at the same time, damping will occur by backward flow of the liquid substance 36 through side orifice 27 and center orifice 22. Once the aircraft has come to a stop, the gas pressure in space 37 will be sufficient to carry the load of the aircraft and will cause the piston to be extended somewhat to provide room for movement of the shock absorber during taxiing. It is understood that the use of a liquid in this type of shock absorber and in other similar types of dampers and liquid springs has not been previously possible throughout the temperature range encountered by high speed aircraft since no liquid has been available that could withstand the high temperatures encountered and still be in the liquid state at the lowest temperatures encountered. For instance, hydrocarbon liquid now in general use will be gasified at a temperature far below the maximum temperature which must be withstood by the device. The present invention, therefore, makes possible use of devices which require substance which can be maintained in the liquid state over a large temperature range. While the invention has been illustrated in connection with a high temperature shock absorber, it is understood that it is generally applicable to all types of liquid dampers and springs in which a retarding force is produced by the flow of liquid through an orifice. While the heat coil 40 or 40a has been shown in a particular shape, it is understood that the coil can extend to all sections of the device which requires heating to maintain the liquid state. Various other modifications are contemplated by those skilled in the art without departing from the spirit and scope of the invention as hereinafter defined by the appended claims.

What is claimed is:

1. In a damping device operable over a wide range of ambient temperatures to produce a restraining force between two relatively movable members, a casing connected to one of said members, hollow piston means fluidtightly interfitted with and extending into said casing and connected to the other of said members, an intercommunicating orifice in the bottom of said piston means to permit interflow of fluid between said casing and said piston, a damping substance comprised of eutectic alloy within said casing and within said piston which is solid at temperatures at the lower end of said wide range of temperature and is liquid at all other temperatures within said range and heating means inserted in said piston and configured about said orifice to heat said substance for converting and maintaining it in the liquid state at said temperatures above said predetermined temperature, said substance being forced in liquid form through said orifice at all temperatures in said range upon relative movement between said casing and said piston means.

2. In a damping device operable over a wide range of ambient temperatures to produce a restraining force between two relatively movable members, a casing connected to one of said members, hollow piston means fluidtightly interfitted with and extending into said casing and connected to the other of said members, an intercommunicating orifice in the bottom of said piston means to permit interflow of fluid between said casing and said piston, a damping substance comprised of eutectic alloy within said casing and within said piston which is solid at temperatures at the lower end of said wide range of temperature and is liquid at all other temperatures within said range and heating means in heat transfer relationship with said substance for converting and maintaining it in the liquid state at said temperatures above said predetermined temperature, said substance being forced in liquid form through said orifice at all temperatures in said range upon relative movement between said casing and said piston means.

References Cited in the file of this patent

UNITED STATES PATENTS

| | | |
|---|---|---|
| 2,065,832 | Spyker | Dec. 29, 1936 |
| 2,139,817 | Gogan | Dec. 13, 1938 |
| 2,342,381 | Thornhill | Feb. 22, 1944 |
| 2,410,992 | Myklestad | Nov. 12, 1946 |
| 2,442,741 | Morgan et al. | June 1, 1948 |
| 2,449,335 | Sowa | Sept. 14, 1948 |
| 2,496,497 | Russell | Feb. 7, 1950 |
| 2,514,140 | O'Connor | July 4, 1950 |
| 2,672,954 | Bennett | Mar. 23, 1954 |
| 2,748,570 | Booth | June 5, 1956 |
| 2,800,320 | Jarrett et al. | July 23, 1957 |
| 2,805,854 | Gaebler | Sept. 10, 1957 |

FOREIGN PATENTS

| | | |
|---|---|---|
| 726,544 | France | Mar. 7, 1932 |

UNITED STATES PATENT OFFICE
CERTIFICATE OF CORRECTION

Patent No. 3,067,841  December 11, 1962

Giles A. Kendall

It is hereby certified that error appears in the above numbered patent requiring correction and that the said Letters Patent should read as corrected below.

Column 4, lines 22 and 41, after "range", each occurrence insert a comma; same column 4, lines 25, 43 and 44, for "above said predetermined temperature", each occurrence, read -- at the lower end of said wide range --.

Signed and sealed this 18th day of June 1963.

(SEAL)
Attest:

ERNEST W. SWIDER
Attesting Officer

DAVID L. LADD
Commissioner of Patents